(12) United States Patent
Oh et al.

(10) Patent No.: US 8,887,186 B2
(45) Date of Patent: Nov. 11, 2014

(54) ANALYSIS METHOD AND SYSTEM FOR AUDIENCE RATING AND ADVERTISEMENT EFFECTS BASED ON VIEWING BEHAVIOR RECOGNITION

(71) Applicant: Electronics and Telecommunications Research Institute, Daejeon-si (KR)

(72) Inventors: Cheon-In Oh, Daejeon-si (KR); Han-Kyu Lee, Daejeon-si (KR); Young-Ho Jeong, Daejeon-si (KR); Jin-Woo Hong, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 13/871,635

(22) Filed: Apr. 26, 2013

(65) Prior Publication Data

US 2014/0053173 A1  Feb. 20, 2014

(30) Foreign Application Priority Data

Aug. 17, 2012  (KR) .......................... 10-2012-0090263

(51) Int. Cl.
| | |
|---|---|
| *H04N 9/00* | (2006.01) |
| *G06F 3/00* | (2006.01) |
| *H04N 21/442* | (2011.01) |
| *G06Q 30/02* | (2012.01) |
| *G06F 17/30* | (2006.01) |

(52) U.S. Cl.
CPC ..... *H04N 21/44218* (2013.01); *G06Q 30/0242* (2013.01); *G06Q 30/0269* (2013.01); *G06Q 30/0244* (2013.01); *G06Q 30/0251* (2013.01); *G06F 17/30867* (2013.01); *G06Q 30/0271* (2013.01); *G06Q 30/0255* (2013.01)
USPC ......... 725/12; 725/42; 705/14.41; 705/14.43; 705/14.49; 705/14.53; 705/14.66; 705/14.67; 707/732; 707/736; 707/738; 707/748; 707/749; 707/751

(58) Field of Classification Search
USPC ............. 725/12, 42; 705/14.41, 14.43, 14.49, 705/14.53, 14.66, 14.67; 707/732, 736, 707/738, 748, 749, 751
See application file for complete search history.

(56) References Cited

U.S. PATENT DOCUMENTS

| | | | |
|---|---|---|---|
| 5,771,307 A | * | 6/1998 | Lu et al. ........................ 382/116 |
| 5,793,409 A | * | 8/1998 | Tetsumura ....................... 725/12 |

(Continued)

FOREIGN PATENT DOCUMENTS

| | | |
|---|---|---|
| KR | 10-2010-0040026 | 4/2010 |
| KR | 10-2010-0116306 | 11/2010 |
| KR | 10-2011-0047661 | 5/2011 |

*Primary Examiner* — Hoang-Vu A Nguyen-Ba
(74) *Attorney, Agent, or Firm* — Nelson Mullins Riley & Scarborough LLP; Anthony A. Laurentano, Esq.; Lewis Lee, Esq.

(57) ABSTRACT

Provided are an analysis method and system for audience rating and advertisement effects based on viewing behavior recognition including a method of recognizing a viewer on the basis of image recognition through a camera and efficiently collecting data and a method of transmitting collected data on the basis of viewer recognition to an audience rating and advertisement effect measurement server. The present invention includes a viewing behavior measurement device configured to receive a viewer image obtained by imaging one or more viewers who are viewing broadcast content, recognize the one or more viewers from the received viewer image to generate viewing behavior information, and deliver the generated viewing behavior information, and an advertisement effect measurement server configured to analyze an advertisement effect for each viewer on the basis of the received viewing behavior information and generate and deliver an advertisement effect measurement result.

16 Claims, 4 Drawing Sheets

(56) References Cited

U.S. PATENT DOCUMENTS

| | | |
|---|---|---|
| 7,194,458 B1 * | 3/2007 | Micaelian et al. ............ 707/706 |
| 7,793,326 B2 * | 9/2010 | McCoskey et al. ............ 725/91 |
| 7,949,722 B1 * | 5/2011 | Ullman et al. ................ 709/217 |
| 7,979,880 B2 * | 7/2011 | Hosea et al. .................... 725/46 |
| 2007/0073646 A1 * | 3/2007 | Uchibe et al. .................... 707/2 |
| 2008/0046930 A1 * | 2/2008 | Smith et al. .................... 725/46 |
| 2009/0007171 A1 * | 1/2009 | Casey et al. .................... 725/34 |
| 2009/0037945 A1 * | 2/2009 | Greig et al. .................... 725/10 |
| 2009/0070789 A1 * | 3/2009 | Huscroft et al. .............. 719/321 |
| 2010/0280906 A1 * | 11/2010 | Lim et al. .................. 705/14.66 |
| 2010/0313214 A1 * | 12/2010 | Moriya et al. .................. 725/12 |
| 2011/0154399 A1 * | 6/2011 | Jin et al. .......................... 725/46 |
| 2011/0197224 A1 * | 8/2011 | Meijer ............................ 725/34 |
| 2013/0263178 A1 * | 10/2013 | Dow et al. ...................... 725/32 |

\* cited by examiner

ANALYSIS METHOD AND SYSTEM FOR AUDIENCE RATING AND ADVERTISEMENT EFFECTS BASED ON VIEWING BEHAVIOR RECOGNITION

CROSS-REFERENCE TO RELATED APPLICATION

This application claims the benefit under 35 U.S.C. §119 (a) of a Korean Patent Application No. 10-2012-0090263, filed on Aug. 17, 2012, the entire disclosure of which is incorporated herein by reference for all purposes.

BACKGROUND

1. Field

The following description relates to a method and system for analyzing audience rating and advertisement effect measurement data based on viewing behavior of a viewer, and more particularly, to a method of analyzing viewing behavior information about a viewer from an image collected using a camera and efficiently transmitting the audience rating and advertisement effect measurement data and a method of analyzing the received data in a server.

2. Description of the Related Art

Development in communication technologies and various media is leading to fast development in broadcasting and communication technologies with televisions. With such developments, technologies associated with analysis of audience ratings and advertisement effects are being developed. Audience ratings are measured to evaluate efficiencies of broadcast programs, and broadcasting companies may find out audience's satisfaction with the broadcast programs on the basis of the audience ratings. In particular, it is natural that advertisers who pay a large amount of money as advertisement charges should be sensitive to the audience ratings and advertisement effects.

In Korea, measurement of TV audience ratings and broadcasting advertisement effects is performed by two research companies: AGB Nielsen Media Research and TNmS Multimedia. An audience rating research method that is performed by the two research companies includes selecting a sample group for an audience rating research and installing a people meter in the sample group.

A prior art method using the people meter includes selecting a sample group representative of a population, which has good distribution in terms of region, age, sex, and education level, and then collecting viewing behavior information about broadcast programs and advertisements provided to the sample group by means of the people meter. The method also includes delivering the collected information to an advertisement effect measurement server and measuring and analyzing advertisement effect to report the advertisement effect in addition to a result of monitoring the actual exposure of the advertisement and the program.

However, the prior art method has several limitations. Specifically, its reliability depends on the cooperation degree of the sample group. For the people meter, a viewer should push his/her button to input viewer information and then view a broadcast program. Furthermore, the viewer should also input the viewer information at the time of channel change. When two or more viewers are viewing a broadcast program, all the viewers should input their viewer information. Such features of the people meter let the reliability to be seriously affected by the cooperation degree of the viewers. For example, though multiple viewers are viewing a broadcast program, only one viewer may input the viewer information. When a viewer is replaced with another viewer, the replaced viewer may not input the viewer information for the viewer replacement. For the above reason, a personal audience rating is taken as multiplication of the average number of family members by a household audience rating.

A recent people meter includes a measurement module, such as an infrared sensor, to prevent a viewing history from being recorded when there is no viewer while a television is turned on. However, the people meter still has a limitation when a viewer is sleeping or does not stare at a television. Also, for viewing of advertisement, although most viewers have viewing behavior of making more concentration on advertisements closer to a start time of a broadcast program, a viewer is taken as viewing an advertisement. Thus, there is a difference between an actual audience rating and a measured audience rating.

Furthermore, because the method of directly pushing a button to input the viewer information has difficulties in rapidly performing various operations and has a significantly slow response speed of interfacing with a TV in comparison with direct click or touch type, during the collection of measured data, the method may not collect data required to be collected. Also, since the method depends on the cooperation of viewers, its reliability may differ depending on the cooperation degree.

Existing effect measurement indicators include impression (Imp) that refers to the total number of times an advertisement is displayed in all the media, only on the basis of a viewing history, regardless of audience rating repetition, reach that refers to the total number of different people or households exposed, at least once, to an advertisement during a given period, frequency that refers to the number of times specific households are exposed to an advertisement, which is used to determine an advertisement exchange frequency, CPR (cost per reach) that refers to a ratio based on how much it costs to raise the reach by 1%, which shows how efficiently an advertisement is executed, CPM (cost per mile) which is used to fix an advertisement price, etc. Considering that a typical exposure time of a TV advertisement is 15 seconds, calculating the above indicators in the prior art method may cause difference between an actual audience rating and a measured audience rating. Furthermore, the data is analyzed every minute in the prior art viewing history. Accordingly, in order to more exactly measure an advertisement audience rating and advertisement effect, the analysis should be performed every second and thus an efficient technique of storing and transmitting data is also needed.

SUMMARY

The following description relates to the method and system for analyzing audience rating and advertisement effect on the basis of viewing behavior recognition according to an embodiment of the present invention, including a viewing behavior measurement device and an advertisement effect measurement server.

In one general aspect, a viewing behavior measurement device includes an information collection unit configured to check information about current broadcast content to deliver broadcast content information; a viewer recognition unit configured to receive a viewer image obtained by imaging one or more viewers who are viewing the broadcast content and recognize the one or more viewers from the received viewer image to generate and deliver viewer recognition information, and a data processing unit configured to generate viewing behavior information about the one or more viewers using the viewer recognition information and the broadcast content information and deliver the generated viewing behavior information.

The data processing unit does not store the viewing behavior information when there is no change in the viewing behavior information and stores the viewing behavior information only when a change in the viewing behavior information occurs. Also, the data processing unit delivers the generated viewing behavior information only when a predetermined transmission condition is satisfied.

Furthermore, the data processing unit may compare face regions of the one or more viewers with previously stored personal information using the received viewer recognition information to distinguish between a registered viewer whose information is contained in the stored personal information and an unregistered viewer whose information is not contained in the stored personal information, and generate the viewer behavior information. The data processing unit may find out gaze directions of the one or more viewers using the received viewer recognition information to distinguish between a viewer whose gaze direction is toward the broadcast content and a viewer whose gaze direction is not toward the broadcast content.

An advertisement effect measurement server includes an advertisement effect analysis unit configured to distinguish between a registered viewer and an unregistered viewer and distinguish between a viewer whose gaze direction is toward broadcast content and a viewer whose gaze direction is not toward the broadcast content on the basis of the received viewing behavior information to analyze an advertisement effect for each viewer and generate and deliver an advertisement effect measurement result, and an advertisement effect transmission unit configured to deliver the advertisement effect measurement result to an external user.

The method of measuring viewing behavior according to an embodiment of the present invention includes setting a transmission type on the basis of received transmission type setting information and recognizing viewing behavior from a viewer image input through an image input device. Also, the method includes storing viewing behavior information when the recognized viewing behavior changes, checking a transmission condition for data transmission, and delivering the recognized viewing behavior information to the advertisement effect measurement server when the transmission condition is satisfied.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, embodiments of the present invention will be described in detail with reference to the accompanying drawings. Terms used herein are terms that have been selected in consideration of functions and effects in embodiments, and the meanings of the terms may be altered according to the intent of a user or operator, or conventional practice. Therefore, the meanings of terms used in the below-described embodiments confirm to definitions when defined specifically in the specification, but when there is no detailed definition, the terms should be construed as meanings known to those skilled in the art.

The present invention provides an analysis method and system for audience rating and advertisement effects based on viewing behavior recognition including a method of recognizing a viewer on the basis of image recognition through a camera and efficiently collecting data and a method of transmitting collected data on the basis of viewer recognition to an audience rating and effect measurement server.

Figure 1:
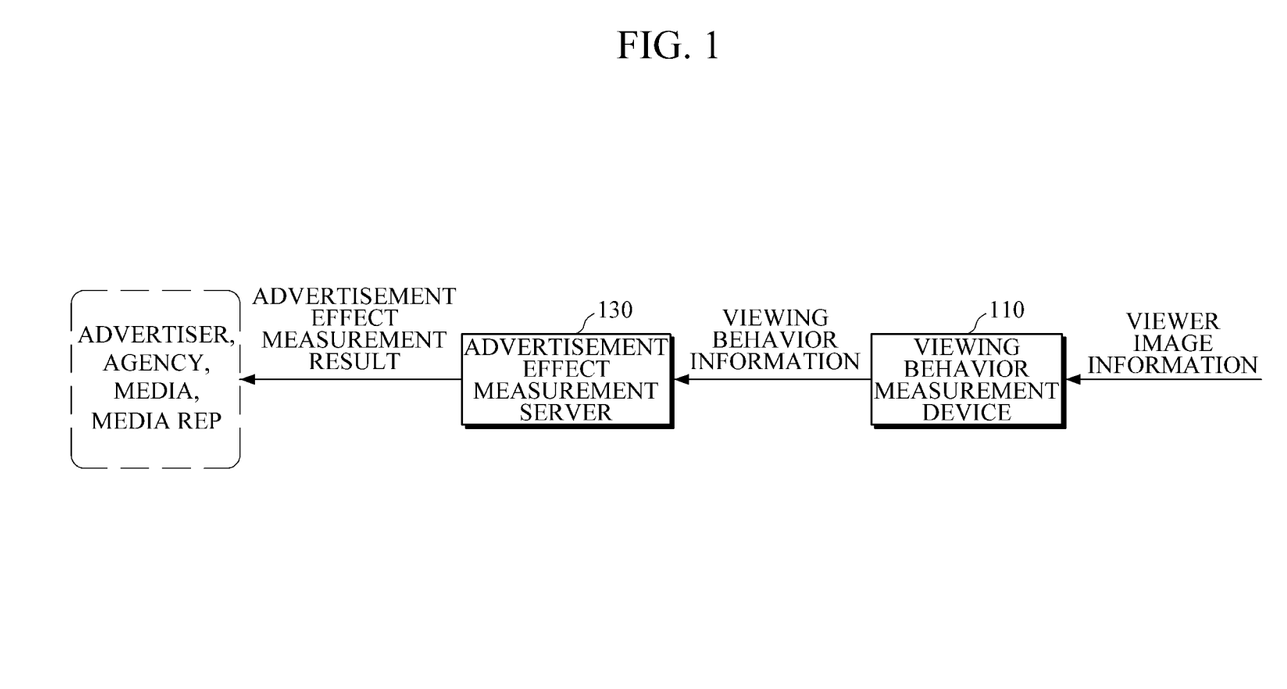
FIG. 1 is a block diagram showing a system for analyzing audience ratings and advertisement effects based on viewing behavior recognition according to an embodiment of the present invention.

FIG. 1 is a block diagram showing a system for analyzing audience ratings and advertisement effects based on viewing behavior recognition according to an embodiment of the present invention.

Referring to FIG. 1, the system for analyzing audience ratings and advertisement effects based on viewing behavior recognition according to an embodiment of the present invention includes a viewing behavior measurement device 110 and an advertisement effect measurement server 130.

The viewing behavior measurement device 110 generates an image of a viewer through an image input device such as a camera, recognizes the viewer from the image, analyzes viewing behavior of the viewer, and generates viewing behavior information. Also, the viewing behavior measurement device 110 transmits the generated viewing behavior information to the advertisement effect measurement server 130.

The advertisement effect measurement server 130 analyzes advertisement effects based on the viewing behavior information delivered from the viewing behavior measurement device 110 and provides the analysis result to a user such as an advertiser, advertising agency, advertising media, and media rep. The viewing behavior measurement device 110 and the advertisement effect measurement server 130 will be described in details with reference to FIGS. 2 and 3.

Figure 2:
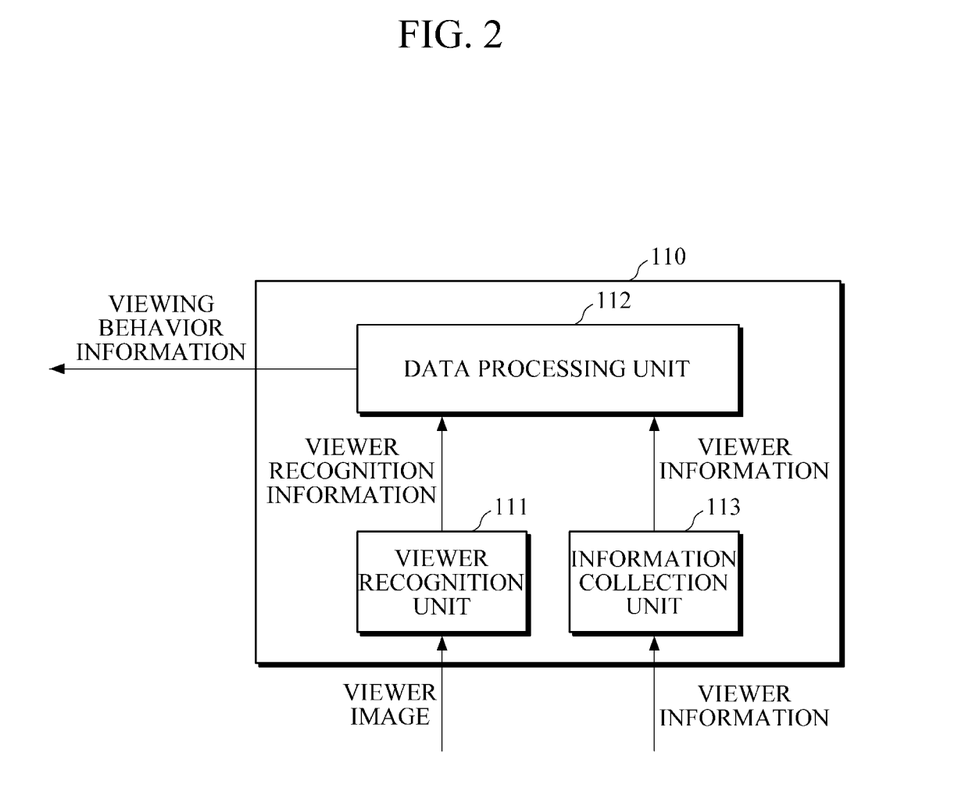
FIG. 2 is a block diagram showing a viewing behavior measurement device according to an embodiment of the present invention.

FIG. 2 is a block diagram showing a viewing behavior measurement device according to an embodiment of the present invention.

Referring to FIG. 2, the viewing behavior measurement device 110 according to an embodiment of the present invention includes a viewer recognition unit 111, a data processing unit 112, and an information collection unit 113.

The information collection unit 113 receives viewer information in a prior art people meter type. The information collection unit 113 may find out viewers through input buttons corresponding to the viewers and receive information including the number of viewers, channel change, etc. The information collection unit 113 receives the viewer information and delivers the received viewer information to the data processing unit 112.

The viewer recognition unit 111 obtains one or more viewer images through an image input device and analyzes the obtained viewer images to recognize the viewer. The viewer recognition unit 111 delivers the recognized viewer information to the data processing unit 112. The image input device may include an image generation device, such as a camera and a webcam. The viewer recognition unit 111 delivers the viewer recognition information generated from the viewer image to the data processing unit 112.

The data processing unit 112 processes the viewer information received from the viewer recognition unit 111 and then delivers the processed viewer information to the advertisement effect measurement server 130. The data processing unit 112 generates viewing behavior information using the viewer recognition information received from the viewer recognition unit 111 and the viewer information received from the information collection unit 113. Also, the data processing unit 112 delivers the generated viewing behavior information to the advertisement effect measurement server.

The data processing unit 112 analyzes a face region of the recognized viewer included in the delivered viewer recognition information. The data processing unit 112 may find out a shape of the face of the viewer by analyzing the face region of the viewer and check the gaze direction of the viewer to determine whether the viewer makes concentration on the current broadcast program. The data processing unit 112 may determine the age and sex of the viewer.

The data processing unit 112 may compare the face shape of the viewer with stored personal information to identify the viewer. The identified viewer may be largely classified into a registered viewer and an unregistered viewer. The registered viewer denotes a viewer whose personal information is previously stored in a data processing unit 112 and an advertisement effect measurement server 130 through a registration procedure. Accordingly, for the registered viewer, the viewer information including the gender, age, region, etc. may be found out just through its identification. Also, the demographic information including the gender, age, region, etc. may be analyzed by delivering just the ID of the viewer. For the unregistered viewer, the viewer information can not be found out only through its identification. However, the unregistered viewer should be considered to exactly calculate advertisement effect measurement indicators because the unregistered viewer also affects the personal audience rating.

The data processing unit 112 collects the total number of registered and unregistered viewers and viewing behavior information about the registered and unregistered viewers. The collection is performed at predetermined intervals such as every second. To find out the number of viewers, two methods may be used. One method is to analyze face regions of viewers to find out only viewers whose gaze direction is toward a broadcast program, that is, the viewers who actually view a broadcast program. In this case, only viewers who actually make concentration on a broadcast program are found out. The other method is to find out the number of all recognized viewers, regardless of their gaze directions. The reason of finding out the number of all recognized people, regardless of whether they view a broadcast program or not, is that there is a case where people who do not view but just listen to the broadcast program are included in calculating an audience rating.

The viewing behavior information may include screen position information, immersion degree of a viewer, etc. The screen position information includes which portion of a television a user looks at, which is analyzed for each pixel or region at certain distances.

The viewer recognition information and viewer information collected by the data processing unit 112 is recorded at predetermined intervals, such as every second, according to a reference time that is synchronized with the advertisement effect measurement server 130.

The maximum number of the viewers registered with the data processing unit 112 is not limited. However, it is desired that the maximum number is seven because the number of household members is limited to seven in a population census survey of the Statistics Korea and, as a result of the survey, the number of households having six or less members is over 99.6%.

Data collected by the data processing unit 112 may be stored at predetermined intervals such as every second. However, the data may be stored only when the number of actual viewers who actually view a broadcast program changes, that is, only when the viewing behavior changes, thereby increasing storage efficiency. For a viewer who does not stare at a screen, detailed measurement of his/her viewing behavior such as position information, an immersion degree, etc. is unnecessary. For example, if one viewer views a specific program from 3 PM to 3:10 PM and the number of viewers does not change, a viewing behavior record up to 3:10 PM is the same as one at 3 PM. Accordingly, only the viewing behavior record at 3 PM may be stored, and when the viewing behavior changes, the changing time and content may be stored.

However, in order to discriminate the data from null data, it is necessary that an index for indicating the same data as the previous data should be represented or null should be represented when there is no viewing behavior history. The viewing behavior of the viewer may be maintained the same during a certain time period or, in contrast, frequently changed. Thus, according to the method of storing the data only when the change is made, as described above, the amount of data to be collected may be decreased and a transmission load may be reduced when the data is delivered to the advertisement effect measurement server 130.

TABLE 1

An example of viewing behavior information

| Date | Time | Total number | Actual number | First viewer (A1) | Second viewer (A2) | Third viewer (A3) | Fourth viewer (A4) | Fifth viewer (A5) | Sixth viewer (A6) | Seventh viewer (A7) |
|---|---|---|---|---|---|---|---|---|---|---|
| 2012-03-28 | 15:00:00 | 5 | 4 | 100001 | | 100003 | | 100005 | | |
| 2012-03-28 | 15:00:01 | 4 | 4 | 100001 | | 100003 | | 100005 | | |
| 2012-03-28 | 15:00:02 | 3 | 2 | 100001 | | 100003 | | 100005 | | |
| 2012-03-28 | 15:00:03 | 1 | 1 | 100001 | | | | | | |
| 2012-03-28 | 15:00:04 | 1 | 1 | 100001 | | | | | | |

TABLE 1-continued

An example of viewing behavior information

| Date | Time | Total number | Actual number | First viewer (A1) | Second viewer (A2) | Third viewer (A3) | Fourth viewer (A4) | Fifth viewer (A5) | Sixth viewer (A6) | Seventh viewer (A7) |
|---|---|---|---|---|---|---|---|---|---|---|
| 2012-03-28 | 15:00:05 | 2 | 1 | 100001 | | | | | | |
| 2012-03-28 | 15:00:06 | 7 | 5 | | | | 100004 | 100005 | 100006 | 100007 |
| 2012-03-28 | 15:00:07 | 7 | 3 | | | | 100004 | 100005 | 100006 | 100007 |

Referring to Table 1, it is recorded at every second whether 7 registered viewers view a broadcast program, respectively. The total number of viewers denotes the number of all viewers recognized through the viewer recognition unit 111, and the actual number of viewers denotes the number of viewers whose gaze direction is toward a TV screen where a program is broadcast. First to seventh viewers denote 7 registered viewers, and a lower item for each registered viewer is an ID of the viewer (for example, 100001 that is a lower item of the first viewer). In the first row, the total number of viewers is 5, the number of registered viewers, A1, A3, and A5, is 3, and thus the number of unregistered viewer is 2. And also, since the number of actual viewer is 4, it can be seen that one viewer is at the TV terminal but does not stare at the TV screen. For registered viewers, additional information about viewing behavior is stored as a lower record item. The additional information about viewing behavior may be stored as shown in Table 2. Configuration of stored data may be changed according to system characteristics and user convenience.

TABLE 2

An example of additional information about a registered viewer A1

| ID | VIEWING POSITION | IMMERSION DEGREE |
|---|---|---|
| 100001 | 200.300 | 90% |

The data processing unit 112 and the advertisement effect measurement server 130 are time-synchronized with each other. Data collected by the viewer recognition unit 111 and data collected by the information collection unit 113 may be transmitted together or, if necessary, separately. The reason is that when an event such as change in the number of viewers or change in channels occurs and data is transmitted, respective time points where the event occurs in the information collection unit 113 and the viewer recognition unit 111 may be different from each other. For example, if a new viewer starts viewing a broadcast program, the viewer recognition unit 111 may find out the new viewer through image analysis to add data. However, the information collection unit 113 may recognize the new viewer only when receiving an input signal from the new viewer. Thus, difference between the two time points may occur. However, synchronized time information should be also transmitted because the advertisement effect measurement server 130 should perform comparison between data obtained at the same time.

The data processing unit 112 may deliver the viewing behavior information to the advertisement effect measurement server 130 in largely two methods. The first method is a pull type where data is transmitted upon data request from the advertisement effect measurement server 130, and the second method is a push type where data collected by the data processing unit 112 during a certain time is transmitted to the advertisement effect measurement server 130, regardless of the request. Detailed setting of the push type and pull type or selection of one from between the push type and pull type may be performed on the basis of transmission type setting information received from the advertisement effect measurement server.

In the push type data transmission method, the data processing unit 112 delivers data to the advertisement effect measurement server 130 only when an event such as a data change time point, an advertisement content end time, and a broadcasting content schedule exposure notification occurs. For viewing behavior, some data has a value continuously changing every second, and the value changing within a certain range may be stored as a normalized value and then transmitted, thereby increasing transmission efficiency. For example, advertisement content has short exposure time such as 15 to 30 seconds. Thus, viewing behavior needs to be monitored every second in order to provide data service for audience rating and advertisement effect measurement in real time. However, viewing behavior normalization data may be stored only when its value changes, thereby increasing storage efficiency.

In a case of transmitting data simultaneously whenever data is stored, the data processing unit 112 recognizes a data storage operation due to change in viewing behavior as an event and delivers the stored data to the advertisement effect measurement server 130. For example, if a time point when advertisement content exposure is completed or a time point when certain-time exposure of broadcasting content used to measure audience rating for each minute is completed, data is accumulatively stored according to change in viewing behavior and then transmitted at once.

The data processing unit 112 may change a push-type setting value on the basis of transmission type setting information received from the advertisement effect measurement server 130. The push-type data transmission method will be described below with reference to FIG. 4.

Figure 3:
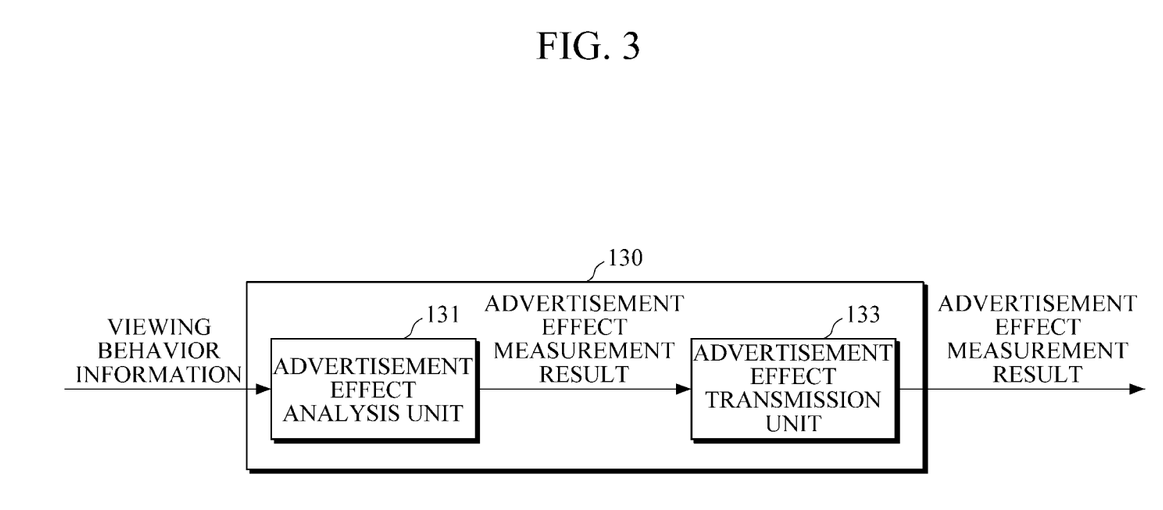
FIG. 3 is a block diagram showing an advertisement effect measurement server according to an embodiment of the present invention.

FIG. 3 is a block diagram showing an advertisement effect measurement server according to an embodiment of the present invention.

Referring to FIG. 3, the advertisement effect measurement server according to an embodiment of the present invention includes an advertisement effect analysis unit 131 and an advertisement effect transmission unit 133.

The advertisement effect analysis unit 131 analyzes advertisement effect on the basis of the received viewing behavior information. When receiving the viewing behavior information from the viewing behavior measurement device, the advertisement effect analysis unit 131 may extract content viewing time in various methods in connection with viewer recognition information including the number of actual viewers from among the registered viewers and the number of unregistered viewers, and viewer information collected by the information collection unit in a prior art method. The connection of the viewer recognition information and viewer information may be enabled using synchronized time information. On the basis of the time information synchronized by a reference time, advertisement effect indicators including audience rating may be calculated by comparing a time schedule table of broadcasting/advertisement contents for terrestrial broadcastings and comparing a program loading time and transmitted data for VoD.

The advertisement effect analysis unit 131 may use the viewer recognition information together with content viewing data including a kind and exposure time of a content included in the received viewing behavior information, thereby exactly calculating a viewing time, an audience rating of advertisement content, and a personal audience rating. Considering all households transmitting data to the advertisement effect measurement server 130, an instantaneous personal audience rating of content for each second may be calculated, and since personal information about the registered viewer is stored, a type analysis of advertisement viewers is enabled by comparison with the personal information.

For example, viewer recognition information may include that four members of one household viewed an advertisement on "A automobile" for one second at first, one of the four members was an unregistered viewer, and another one was a viewer who was at a TV but whose gaze direction was not toward the TV.

Also, the total sum of viewing times may be calculated through the personal viewing time. For example, if a value obtained by summing up personal viewing times of ten households is 1000 seconds when an advertiser exposes a 15-second advertisement on "A automobile" in addition to total 10 broadcasting contents to 10 households 10 times, a ratio of a viewing time to advertisement exposure may be calculated as 1/15. Using this, the advertiser may find out exact advertisement effect more intuitively.

From among the existing advertisement indicators, reach for measuring the number of different people or households exposed, at least once, to an advertisement during a given period, which is used to expect spread effect/awareness, and frequency for measuring the number of times specific households are exposed to an advertisement, which is used to determine an advertisement exchange frequency, are most important elements. The advertisement effect analysis unit 131 may obtain the personal reach and frequency calculated by measuring how much an advertisement is exposed to a specific person, every second, using the viewing behavior information. The personal reach and frequency may be more reliable than a prior art household reach and frequency.

The advertisement effect analysis unit 131 may generate advertisement effect indicators including a personal audience rating, an age-based audience rating, an gender-based audience rating, sum/ratio of advertisement content viewing times, sum/ratio of broadcasting content viewing times, personal reach/frequency, and personal impression, using the received viewing behavior information. Also, a variety of exact indicators may be calculated by applying the viewer recognition information to the existing indicators. The advertisement effect analysis unit 131 delivers a measurement result of advertisement effect to the advertisement effect transmission unit 133.

The advertisement effect transmission unit 133 delivers the measurement result of advertisement effect received from the advertisement effect analysis unit 131, to a user who wants the result, such as an advertiser, advertising agency, advertising media, and media rep.

Figure 4:
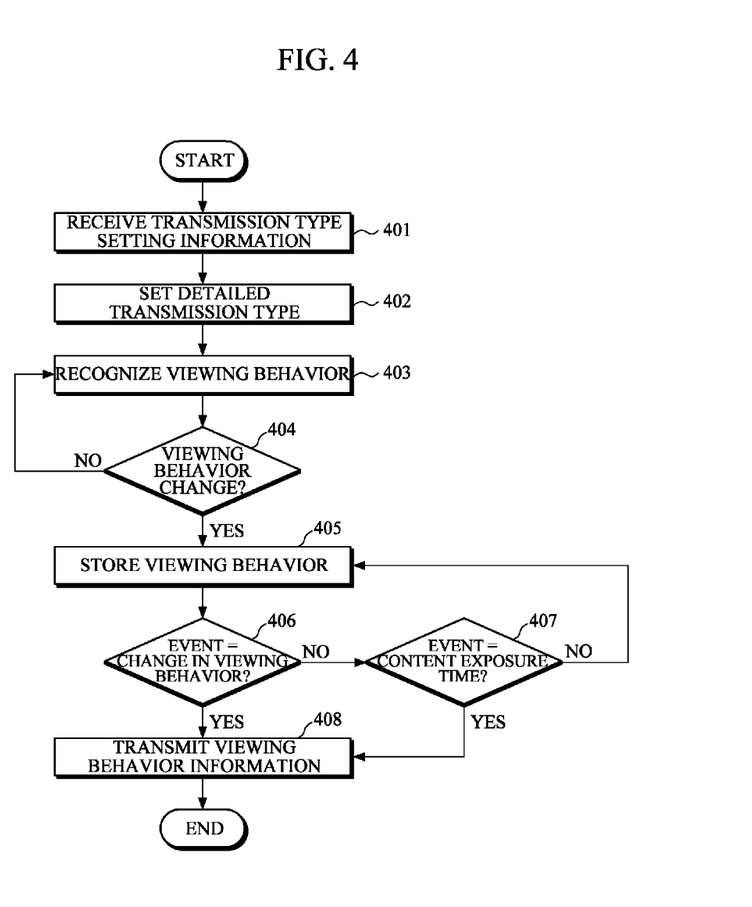
FIG. 4 is a flow chart illustrating a push-type data transmission method of a system for analyzing audience ratings and advertisement effects based on viewing behavior recognition according to an embodiment of the present invention.

FIG. 4 is a flow chart illustrating a push-type data transmission method of a system for analyzing audience ratings and advertisement effects based on viewing behavior recognition according to an embodiment of the present invention.

Referring to FIG. 4, the push-type data transmission method of a system for analyzing audience ratings and advertisement effects based on viewing behavior recognition according to an embodiment of the present invention includes receiving transmission type setting information from the advertisement effect measurement server in 401. The received transmission type setting information may include pull-type or push-type setting information and setting information about an event that is a condition for data transmission. The transmission type setting information may include an advertisement content end time, a broadcasting content exposure time, and a certain time as the setting information about an event that is a condition for data transmission. The advertisement content end time is setting information for setting a time point of ending an advertisement content as an event, and the broadcasting content exposure time is setting information for setting a certain time interval when a broadcasting content is exposed to a viewer as an event.

The method includes setting a detailed transmission type on the basis of the received transmission type setting information in 402. One is selected from between the pull-type data transmission method and the push-type data transmission method on the basis of the received transmission type setting information. If the push-type is selected, data collected for a certain time is transmitted to a server when an event occurs. Furthermore, the event condition is set on the basis of the transmission type setting information.

Next, the method includes recognizing viewing behavior from the recognized viewer information in 403. The method includes analyzing a viewer recognized from a viewer image received through an image input device to recognize viewing behavior of the viewer and generating viewing behavior information on the basis of the viewing behavior of the viewer. The method of finding out the viewing behavior of the viewer includes finding out the number of viewers from the viewer image and checking whether each of the viewers is registered. The method includes analyzing a face region of each viewer to check the immersion degree through whether the gaze direction of the viewer is toward a broadcast program. The viewing behavior information generated from the viewing behavior of the viewer may include the number of registered or unregistered viewers, information about viewed broadcast program, channel information, and an immersion degree according to a gaze direction of a viewer.

Next, the method includes checking whether the recognized viewing behavior changes in 404. The change in the viewing behavior means the change in the number of viewers, a viewing program, a broadcasting channel, viewing position, and immersion degree. The method includes storing the changed viewing behavior when the recognized viewing behavior changes in 405. If the viewing behavior does not change, data for a time period when there is no change is the same. Thus, it may be further efficient to store data whenever the viewing behavior changes, instead of storing data every time interval. That is, the method of storing data only when the change occurs may decrease the amount of data to be collected and thus decrease transmission load in data transmission. If the viewing behavior does not change, the viewing behavior is continuously recognized.

Next, the method includes checking whether an event for data transmission is set to the change in viewing behavior in 406. The push-type data transmission method includes delivering data to the advertisement effect measurement sever only when an event occurs. At first, it is checked whether the event condition for data transmission is set to the change in viewing behavior. The method includes transmitting the stored viewing behavior information to the advertisement effect measurement server if the event condition is set to the change in viewing behavior in 408.

If the event condition for data transmission is not set to the change in viewing behavior, it is checked whether the event condition is a certain content exposure time in 407. If the event condition is not set to the change in viewing behavior, another event condition is searched. If the event condition is satisfied, the data is transmitted. If the event condition is the certain content exposure time, the stored viewing behavior information is transmitted to the advertisement effect measurement server for every the predetermined content exposure time in 408.

The analysis method and system for audience rating and advertisement effects based on viewing behavior recognition according to an embodiment of the present invention performs behavior recognition on the viewer, thereby simultaneously recognizing viewing behaviors of a plurality of viewers and enabling viewing history to be exactly collected, regardless of cooperation of users. Also, data is stored only when viewer recognition changes in data collection and data transmission setting is controlled according to a system environment and a provided service object, thereby enabling efficient transmission and response to the various service requests. And it is possible to newly set the number of viewers, viewing time, etc as broadcasting content and advertisement content effect measurement indicators, and on the basis of the newly set indicators, it is possible to more exactly measure derivative advertisement effect measurement indicators such as impression, reach, and frequency. Furthermore, it is also possible to perform effect measurement in units of a person, not a household and also perform audience rating and effect measurement on the advertisement content.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A viewing behavior measurement device comprising:
    an information collection unit configured to check information about current broadcast content to generate broadcast content information;
    a viewer recognition unit configured to receive a viewer image obtained by imaging one or more viewers who are viewing the broadcast content and recognize the one or more viewers from the received viewer image to generate viewer recognition information; and
    a data processing unit configured to generate viewing behavior information about the one or more viewers using the viewer recognition information and the broadcast content information,
    wherein the viewing behavior information indicates whether each of the one or more viewers concentrate on the current broadcast content or not,
    wherein the data processing unit delivers the viewing behavior information in a selected method between a pull method and a push method.

2. The viewing behavior measurement device of claim 1, wherein the information collection unit is configured to receive viewer information from each of the viewers and deliver the viewer information to the data processing unit.

3. The viewing behavior measurement device of claim 1, wherein the data processing unit is configured not to store the viewing behavior information when there is no change in the viewing behavior information and configured to store the viewing behavior information when a change in the viewing behavior information occurs.

4. The viewing behavior measurement device of claim 1, wherein the data processing unit is configured to compare face regions of the one or more viewers with previously stored personal information using the received viewer recognition information to distinguish between a registered viewer whose information is contained in the stored personal information and an unregistered viewer whose information is not contained in the stored personal information and generate the viewer behavior information.

5. The viewing behavior measurement device of claim 1, wherein the data processing unit is configured to deliver the generated viewing behavior information only when a transmission condition predetermined according to received transmission type setting information is met.

6. The viewing behavior measurement device of claim 1, wherein the data processing unit is configured to find out gaze directions of the one or more viewers using the received viewer recognition information to distinguish between a viewer whose gaze direction is toward the broadcast content and a viewer whose gaze direction is not toward the broadcast content.

7. The viewing behavior measurement device of claim 6, wherein the data processing unit is configured to generate viewing behavior information about only the viewer whose gaze direction is toward the broadcast content.

8. The viewing behavior measurement device of claim 1, wherein the viewing behavior information includes at least one of the number of viewers, gaze directions of the viewers, the broadcast content information, and viewing positions of the viewers.

9. The viewing behavior measurement device of claim 1, wherein the viewing behavior information further includes synchronized time information about the viewer recognition information and the broadcast content information.

10. An advertisement effect measurement server comprising:
    an advertisement effect analysis unit configured to distinguish between a registered viewer and an unregister viewer and distinguish between a viewer whose gaze direction is toward broadcast content and a viewer whose gaze direction is not toward the broadcast content on the basis of received viewing behavior information to analyze an advertisement effect for each one or more viewers and generate an advertisement effect measurement result; and
    an advertisement effect transmission unit configured to deliver the advertisement effect measurement result to an external user,
    wherein the viewing behavior information indicates whether each of the one or more viewers concentrate on the broadcast content or not,
    wherein the advertisement effect transmission unit delivers the advertisement effect measurement result in a selected method between a pull method and a push method.

11. The advertisement effect measurement server of claim 10, wherein the advertisement effect analysis unit is configured to obtain a personal viewing time and audience rating of advertisement content in connection with viewer recognition information and broadcast content information contained in the received viewing behavior information.

12. The advertisement effect measurement server of claim 10, wherein the advertisement effect analysis unit is configured to synchronize the viewer recognition information with the broadcast content information using synchronized time information contained in the viewing behavior information.

13. A method of measuring viewing behavior, the method comprising:

setting a transmission type on the basis of received transmission type setting information;

recognizing viewing behavior from a viewer image input through an image input device;

storing viewing behavior information when the recognized viewing behavior changes; and determining whether a predetermined transmission condition for data transmission is satisfied and, if the transmission condition is satisfied, delivering the recognized viewing behavior information, wherein the viewing behavior information indicates whether each of one or more viewers concentrate on current broadcast content or not, wherein the recognized viewing behavior information is delivered in a selected method between a pull method and a push method.

14. The method of claim 13, wherein the viewing behavior information includes at least one of the number of viewers, gaze directions of the viewers, broadcast content information, and viewing positions of the viewers.

15. The method of claim 13, wherein the transmission type setting information includes at least one of information about a method of transmitting the viewing behavior information only when data is requested and information about a method of transmitting the viewing behavior information only when the predetermined transmission condition is satisfied.

16. An analysis system for audience rating and advertisement effects based on viewing behavior recognition, the system comprising:

a viewing behavior measurement device configured to generate viewer recognition information from a viewer image obtained by imaging one or more viewers who are viewing broadcast content and generate viewing behavior information about the one or more viewers using the viewer recognition information to deliver the viewing behavior information; and an advertisement effect measurement server configured to distinguish between a registered viewer and an unregistered viewer and distinguish between a viewer whose gaze direction is toward broadcast content and a viewer whose gaze direction is not toward the broadcast content on the basis of the received viewing behavior information to analyze an advertisement effect for each viewer, generate an advertisement effect measurement result, and deliver the advertisement effect measurement result to an external user, wherein the viewing behavior information indicates whether each of the one or more viewers concentrate on the broadcast content or not, wherein the advertisement effect measurement server delivers the advertisement effect measurement result in a selected method between a pull method and a push method.

* * * * *